United States Patent [19]
Orimo et al.

[11] Patent Number: 4,811,009
[45] Date of Patent: Mar. 7, 1989

[54] TRANSMISSION CONTROL SYSTEM

[75] Inventors: Masayuki Orimo, Machida; Kinji Mori, Yokohama; Yasuo Suzuki, Ebina, all of Japan

[73] Assignee: Hitachi, Ltd., Tokyo, Japan

[21] Appl. No.: 854,945

[22] Filed: Apr. 23, 1986

[30] Foreign Application Priority Data

Apr. 24, 1985 [JP] Japan ............................ 60-86352

[51] Int. Cl.⁴ .......................................... H04Q 11/04
[52] U.S. Cl. .................................. 340/825.05; 370/88
[58] Field of Search ................. 340/825.05; 370/86, 370/88, 60, 94, 89

[56] References Cited

U.S. PATENT DOCUMENTS

| | | | |
|---|---|---|---|
| 3,597,549 | 8/1971 | Farmer et al. | 370/88 |
| 3,710,026 | 1/1973 | Graham et al. | 370/88 |
| 3,731,002 | 5/1973 | Pierce | 370/88 |
| 4,390,984 | 6/1983 | Sugiura et al. | 370/88 |
| 4,477,807 | 10/1984 | Nakajima et al. | 340/825.48 |
| 4,510,492 | 4/1985 | Mori et al. | 340/825.05 |
| 4,539,679 | 9/1985 | Bux et al. | 370/86 |
| 4,597,078 | 6/1986 | Kemphl | 370/88 |
| 4,621,362 | 11/1986 | Sy | 370/88 |
| 4,627,052 | 12/1986 | Hoare et al. | 370/88 |
| 4,672,373 | 6/1987 | Mori et al. | 370/86 |

Primary Examiner—John W. Caldwell, Sr.
Assistant Examiner—Edwin C. Holloway, III
Attorney, Agent, or Firm—Antonelli, Terry & Wands

[57] ABSTRACT

A transmission control system for a transmission system including a plurality of transmission lines inclusive of closed loops has a plurality of network control processors (NCPs) and devices connected thereto, respectively. Upon issuing of data by a device, an identification code, such as identification number or code allocated inherently to the, is added to the data to be sent to the associated NCP connected to that device, while upon reception of data from the associated NCP, the identification code is checked to avoid duplicate reception of the same data. Also, inter-networking devices may be provided to check the duplicated relaying of the same data between loops. To this end, the transmission control system includes a plurality of transmission lines, a plurality of devices connected to the plurality of transmission lines, respectively, and interconnecting units for interconnecting the plurality of transmission lines through the devices. Each of the devices operates to send out onto the transmission line a message including data generated by the device and to which is added an identification code for identifying the data, and to store the identification code contained in a message upon reception thereof from the transmission line. Upon reception of a message from one of the connected transmission line, the interconnecting unit transmits to the other connected transmission line the message having the identification code which does not coincide with the identification code having been stored before reception of the message from the one connected transmission line.

14 Claims, 6 Drawing Sheets

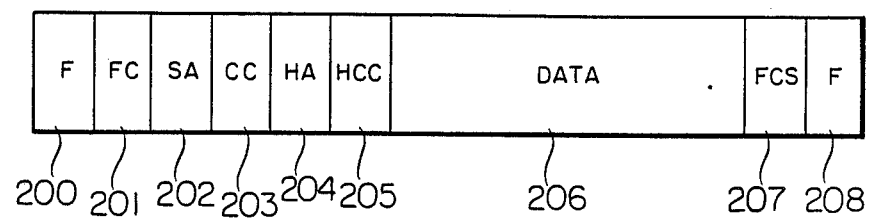
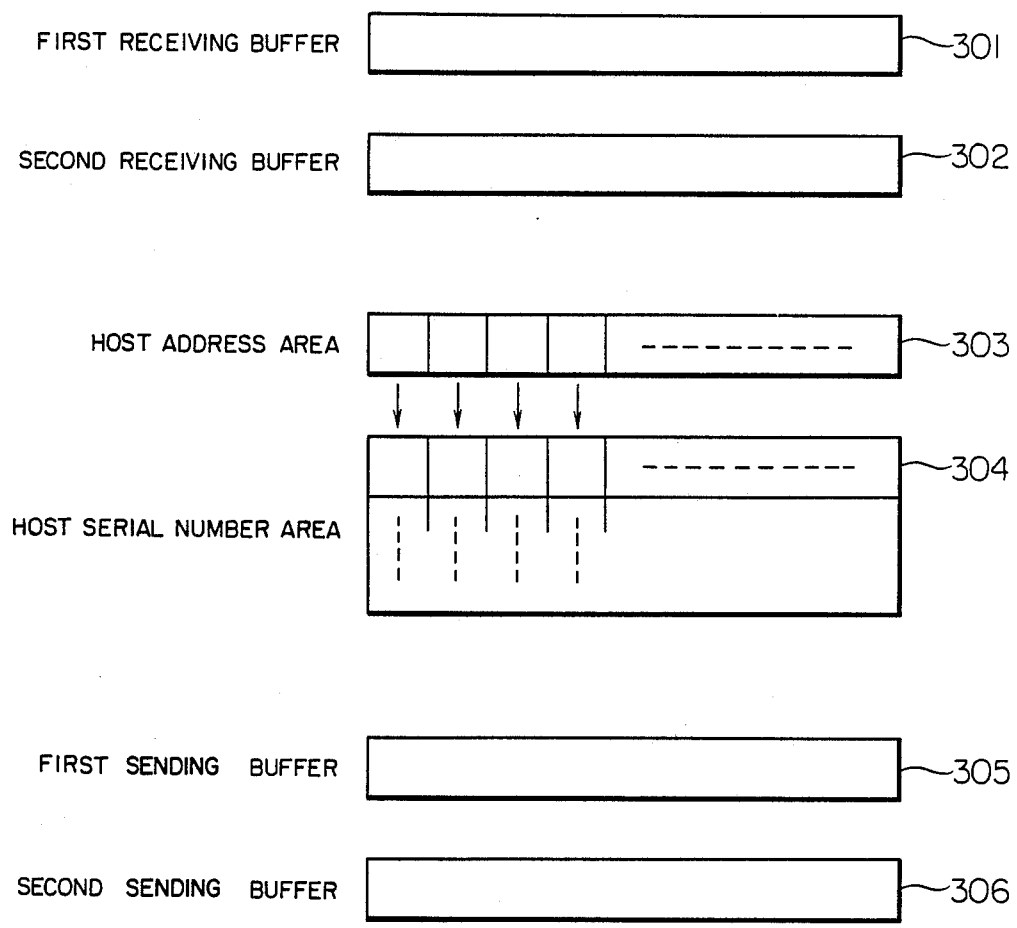

FIG. 3c
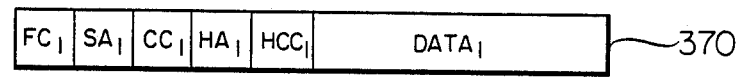
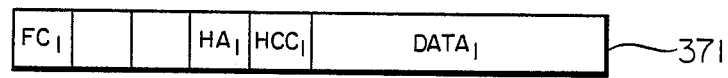
FIG. 4a
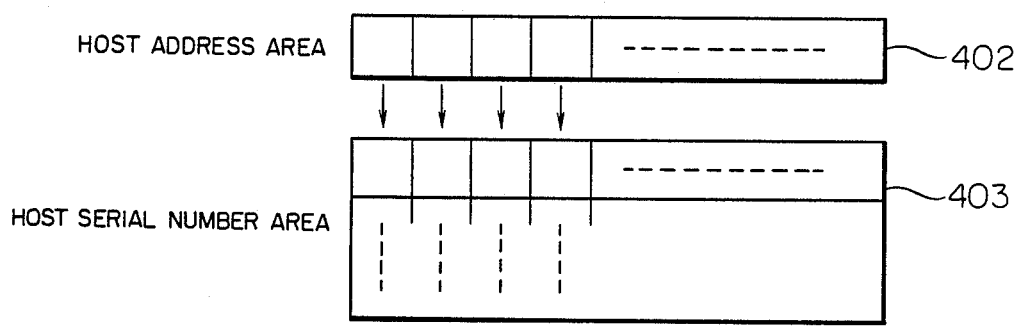
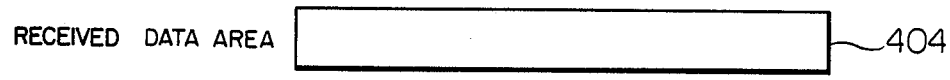

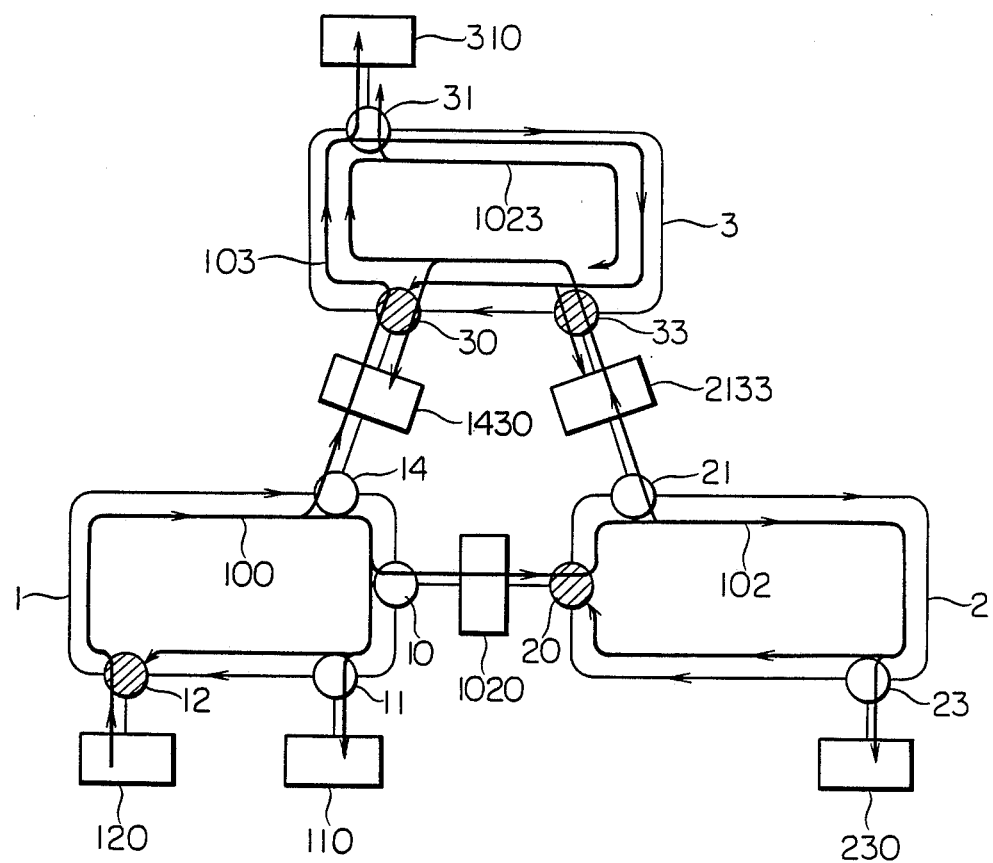

TRANSMISSION CONTROL SYSTEM

BACKGROUND OF THE INVENTION

1. Field of the Invention

The present invention relates to a transmission control in a transmission system including a plurality of transmission lines.

2. Description of the Prior Art

In a loop transmission system (multi-loop transmission system) in which a plurality of loops or transmission lines are mutually connected, there has been known a transmission control method according to which all network control devices connected to the transmission lines all have the same structure, wherein communication of messages among the transmission lines is performed in accordance with the data content of the message without need for the aid of information about the loop configuration and the destination address of the receiving device. Reference may be made to U.S. Pat. No. 4,510,492 issued Apr. 9, 1985. According to this method, the message to be transferred between the loops or transmission lines can be easily altered, while the need for providing network control devices solely for the purpose of relaying message can be advantageously eliminated. However, in the application where the transmission lines are connected to constitute closed loops, a message once issued or generated undesirably may be continuously circulated along the closed loop.

SUMMARY OF THE INVENTION

An object of the present invention is to solve the problem of the prior art transmission control system described above.

Another object of the present invention is to provide a transmission control system having an improved structure in which network control devices (or network control processors) connected to transmission lines can all be implemented in the same structure and which allows data transfer among the transmission lines in accordance with the content of the data without need for the aid of information about loop configuration or a destination address of the receiving device.

In view of the above objects, there is provided according to a general aspect of the invention a transmission system including a plurality of transmission lines, a plurality of devices connected to the plurality of transmission lines, respectively, and interconnecting units for interconnecting the plurality of transmission lines through the devices, each of the devices being capable of sending out onto the transmission line a message including data generated by the device and to which is added an identification code for identifying the data, and being capable of storing an identification code contained in a message upon reception thereof from the transmission line, wherein upon reception a message from one of the connected transmission lines, the interconnecting unit transmits to another connected transmission line the message having the identification code which does not coincide with an identification code stored before reception of the message from the one connected transmission line.

BRIEF DESCRIPTION OF THE DRAWINGS

FIGS. 2, 3c and 4c are views illustrating formats of message employed in the system according to the invention.

FIGS. 3a and 4a are views illustrating storage areas employed according to the teaching of the invention.

FIG. 5 is a schematic block diagram for illustrating the operation of the whole system of the invention.

DESCRIPTION OF THE PREFERRED EMBODIMENTS

In the following, the invention will be described in detail in conjunction with illustrative embodiments thereof.

Figure 1:
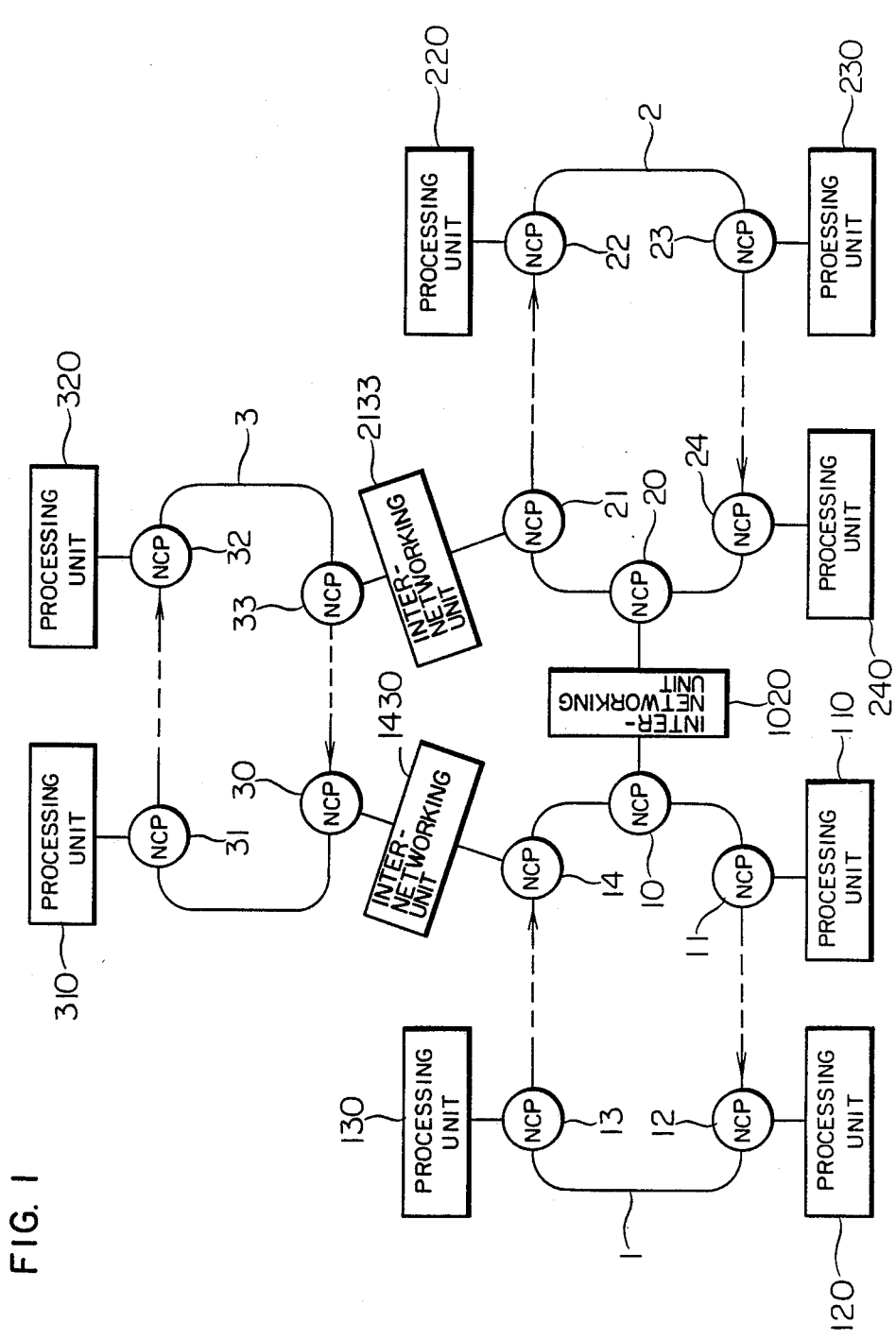
FIG. 1 is a schematic block diagram showing a general arrangement of a transmission system according to an embodiment of the invention.

FIG. 1 shows a general arrangement of a transmission control system according to an embodiment of the invention. It will be seen that three loops or transmission lines 1, 2 and 3 are interconnected through network control processors (hereinafter referred to as NCP) and inter-networking units. More specifically, the transmission loops or lines 1 and 2 are interconnected through the NCPs 10 and 20 and the inter-networking unit 1020. The transmission loops or lines 2 and 3 are interconnected through the NCPs 21 and 33 and the inter-networking unit 2133. The transmission lines 1 and 3 are inter-connected through the NCPs 14 and 30 and the inter-networking unit 1430. Further, the transmission line 1 has connected therein the NCPs 10 to 14, the transmission line 2 has the NCPs 20 to 24 connected therein, and the transmission line 3 includes the NCPs 30 to 33. On the other hand, the processing units 110 to 130 are connected to the NCPs 11 to 13, respectively, the processing units 220 to 240 are connected to the NCPs 22 to 24, respectively, and the processing units 310 and 320 are connected to the NCPs 31 and 32, respectively. The inter-networking unit 1020 is connected in common to both the NCPs 10 and 20, the inter-networking unit 2133 is connected in common to both the NCPs 21 and 33, and the inter-networking unit 1430 is connected in common to both the NCPs 14 and 30. The NCPs 10 to 14, 20 to 24 and 30 to 33 are all of identical structure. It should be mentioned that the NCPs 10, 20, 21, 33, 30 and 14 are not imparted with any specific functions differing from those of the remaining NCPs. Each of the NCPs fetches, i.e., takes only the desired message from those flowing along the associated transmission line, the message as fetched being then transferred to the associated processing unit. Conversely, a message supplied from any one of the processing units is set onto the associated transmission line through the medium of the associated NCP. In this connection, it should be noted that the message includes no destination address so that each of the NCPs can transmit the message without need to know the system structure as adopted, the transmission line to which the receiving or destination NCP belongs, and the address thereof. FIG. 2 shows an example of the message format which can be employed in the transmission system. In the figure, a reference numeral 201 denotes a function code (FC) prepared in correspondence to the content of and/or the function associated with data. A numeral 202 denotes a sender address (SA) of the NCP which prepares and sends the message. A numeral 203 denotes a serial number code (CC) required for communication. A numeral 206 denotes a data field labelled DATA which contains information or data to be processed. A numeral 207 denotes an error or false sensing code (FCS). Numeral 200 and 208 denote flags (F) indicating, respectively, the start and the end of the message. A numeral 204 denotes the address (HA) which is inherent to, i.e., specific to the processing unit and established upon generation of the data by that processing unit, and a numeral 205 denotes a serial number code (HCC) allocated to the generation of data. Each NCP performs the transmission control on the basis of the codes F, FC, SA and FCS. The codes or data HA, HCC and DATA play no part in the transmission control. Each NCP compares a registered function code supplied from the associated processing unit with the code FC of the message on the transmission line to thereby determine whether or not the associated processing unit requires that message. Only when the associated processing unit requires the message, the counterpart NCP fetches that message.

Upon generation of data, each processing unit places the content of data and the function code in the fields DATA and FC of the message format illustrated in FIG. 2. At the same time, a counter incorporated in the processing unit is incremented by one, and the updated content of the counter is placed in the field HCC of the format illustrated in FIG. 2, while the address allocated inherently to the processing unit is set at the section HA. The message thus prepared is sent to the associated NCP to which the processing unit under consideration is connected. The NCP receiving the message from the associated processing unit sends it out on the transmission line after formatting the message, as illustrated in FIG. 2. At that time, the NCP behaves as the sender (originator of the message). When the message sent out by the NCP returns after traveling once around the transmission line to which that NCP belongs, the message is fetched by that NCP, whereupon the message disappears from the transmission line. Unless the message returns within a predetermined time duration, the same message is repeatedly sent out a predetermined number of times until the message returns. The aforementioned transmission control processing performed by the NCP applies similarly to all of the other NCPs.

Next, referring to FIGS. 3 and 4, description will be made on the transmission control procedures performed by the inter-networking units 1020, 1430 or 2133 and the processing units 110 to 130, 220 to 240 and 310 to 320.

Figure 3B:
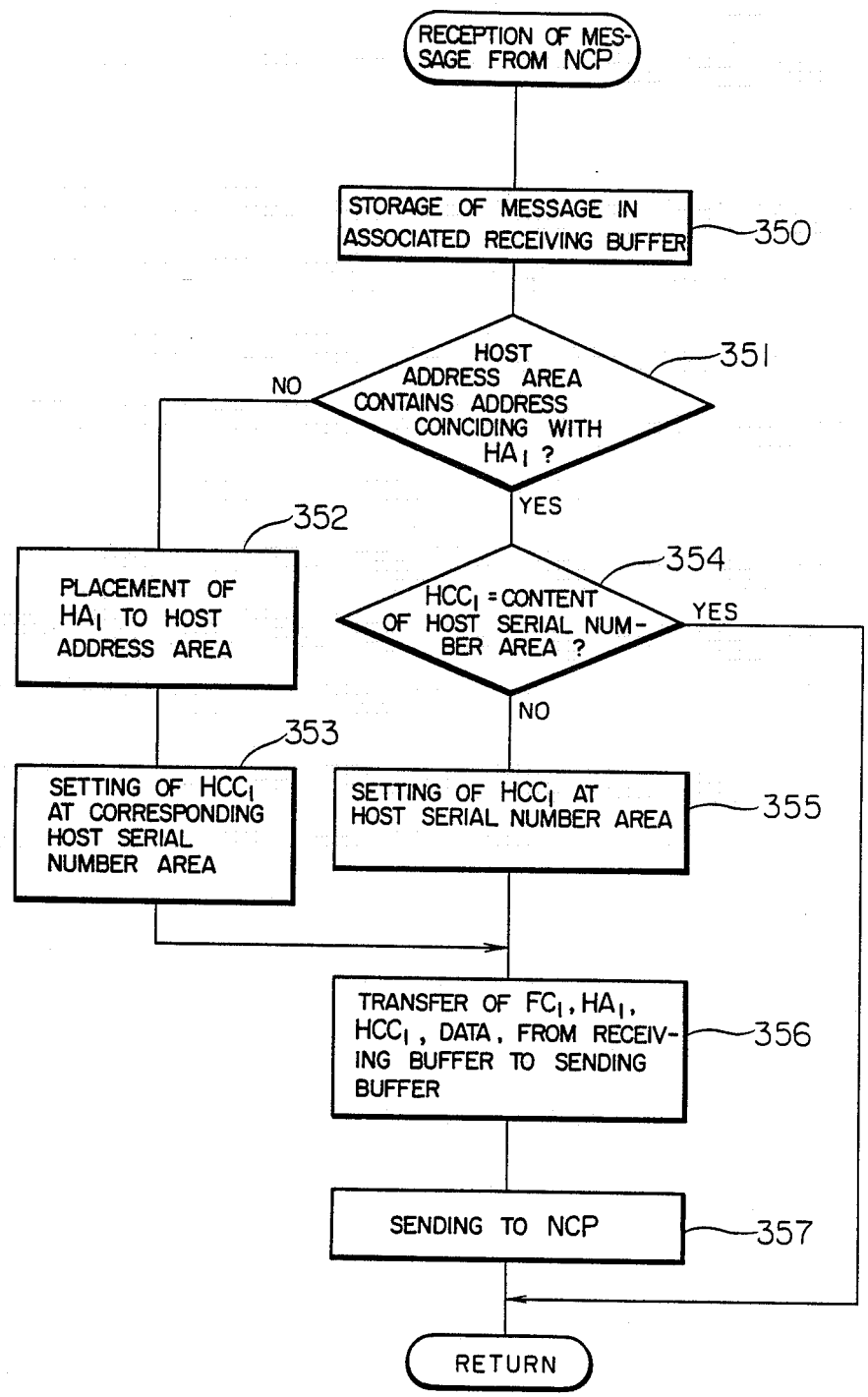
FIGS. 3b and 4b are views showing flow charts for illustrating operations of an inter-networking unit and a processing unit, respectively, in the system according to the invention.

FIGS. 3a to 3c are views for illustrating the transmission control procedures performed by a given one of the inter-networking units. More specifically, FIG. 3a shows data areas in the inter-networking unit, FIG. 3b illustrates a flow of processing, and FIG. 3c shows contents of received data and sending data (i.e. data to be sent). Referring to FIG. 3a, first and second receiving buffers 301 and 302 serve as data storage areas for storing the data or messages received, respectively, from the two transmission lines to which the inter-networking under consideration is connected, while a host address area 303 and a host serial number area 304 serve to store, respectively, the codes HA and HCC contained in the received data or message. In this connection, it should be noted that columns are provided in the areas 303 and 304 in one-to-one correspondence. First and second sending buffers 305 and 306 constitute areas for storing data to be sent out to the associated transmission lines, respectively. Next, the processing performed by the inter-networking unit will be elucidated by referring to FIG. 3b. At first, content of the message received by the NCP from one of the associated transmission lines is stored in the receiving buffer 301 or 302 associated with the one transmission line (step 350). It is assumed that a message 370 of the content illustrated in FIG. 3c is stored in the receiving buffer. At a step 351, it is checked to verify whether the address coinciding with the address HA of the message 370 has already been stored in the host address area 303. When the address coinciding with the address $HA_1$ is not present in the host address area 303, this means that the message as received currently by the inter-networking unit under consideration is one which has not been relayed previously through the same inter-networking unit. Accordingly, the address $HA_1$ is newly set at the host address area (step 352), while the code $HCC_1$ is set in the host serial number area at the location corresponding to that of $HA_1$ set in the host address area (step 353). Subsequently, the contents $FC_1$, $HA_1$, $HCC_1$ and $DATA_1$ in the receiving buffer 301 or 302 are transferred to the associated one of the sending buffers 305 and 306 (step 356). On the other hand, when it is found that the address coinciding with $HA_1$ has been already stored in the host address area, the code $HCC_1$ is then compared with the value stored in the column of the host serial number area 304, which corresponds to the column of the host address area where the address $HA_1$ is located (step 354). When the comparison results in the absence of the value coinciding with $HCC_1$ at the corresponding column, this means that the message is one that has not been relayed previously through the inter-networking unit under consideration. Accordingly, the code $HCC_1$ is set at the column of the host serial number area corresponding to the column where the address $HA_1$ is present (step 355). The processing then proceeds to the following step 356. On the other hand, when it is found at the step 354 that the value coinciding with $HCC_1$ is already present at the corresponding column of the host serial number area, meaning that the message is one relayed already, the relaying processing comes to an end. Through the procedures performed by the inter-networking unit, only that one of the messages received from the associated NCP through the one transmission line which has not been relayed previously is allowed to be transferred to the other transmission line while the data or message relayed once is erased. As will be understood, if the message 370 illustrated in FIG. 3c has not ever been relayed previously, the message 371 shown in FIG. 3c is set in the sending buffer to be sent out to the NCP which is connected to the other transmission line. The NCP receiving the message 371 then arranges it in the format illustrated in FIG. 2 and sends it out on the associated transmission line.

Figure 4B:
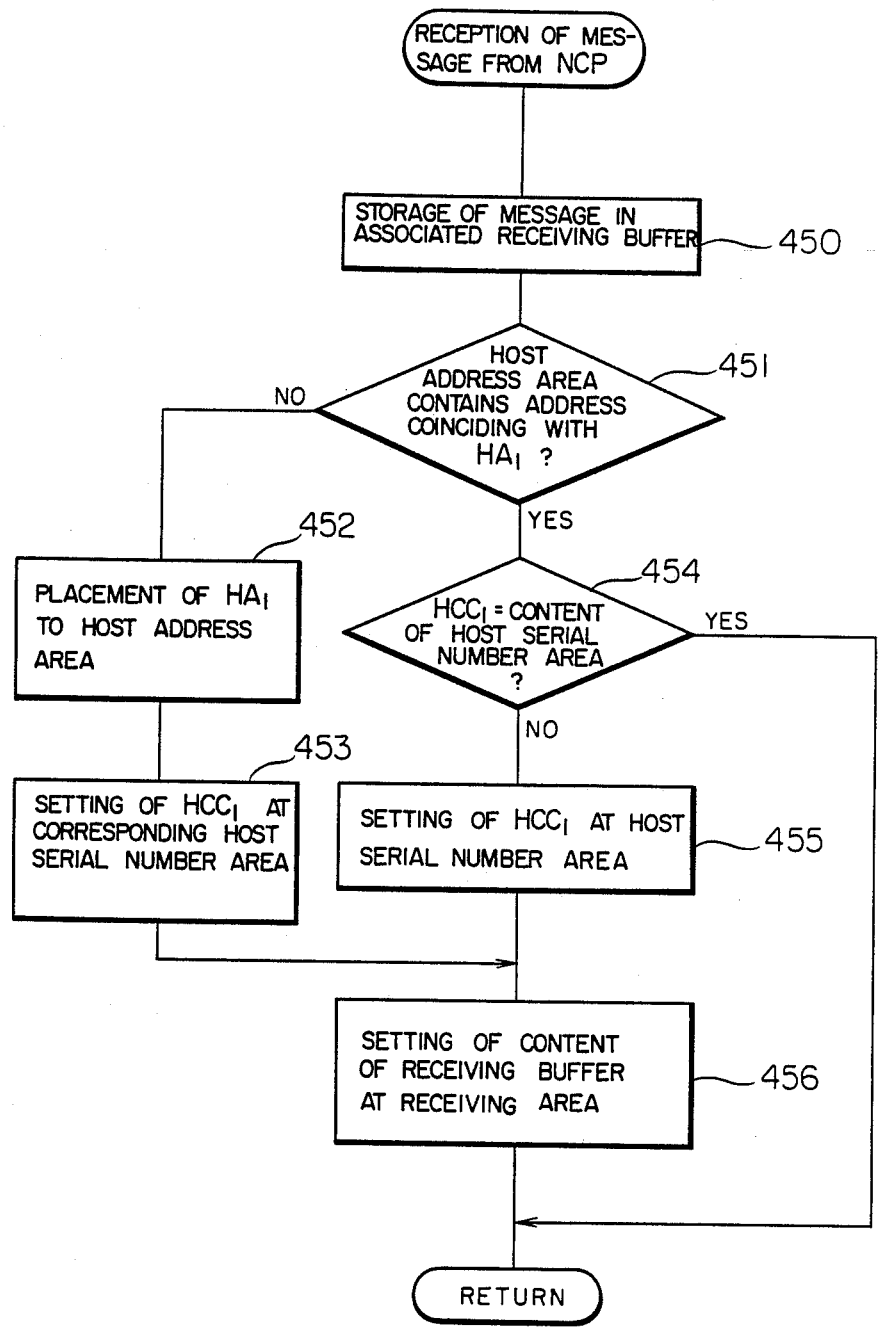

Next, referring to FIGS. 4a to 4c, description will be made of the processing operation of the processing unit upon reception of a message. FIG. 4a is a view for illustrating data areas available in the processing unit. A receiving buffer 401 constitutes a storage area for storing data or message received from the NCP to which the processing unit under consideration is connected. Host address area 402 and host serial number area 403 serve for the same purpose as described above in conjunction with the inter-networking unit. A received data area 404 serves to store the data destined for use by the processing unit. The processing will now be described by referring to FIG. 4b. At first, the data content of a message received by the processing unit from the associated NCP is stored in the receiving buffer 401 (step 450). It is now assumed that a message 470 of the content illustrated in FIG. 4c is stored in the receiving buffer. At a next step 451, it is address HA of the message 470 has already been stored in the host address area 402. When the address coinciding with the address $HA_1$ is not present in the host address area 402, this means that the message as received currently by the processing unit under consideration is the one which has not been received previously by the same processing unit. Accordingly, the address $HA_1$ is newly set at the host address area (step 452), while the code $HCC_1$ is set in the host serial number area at the location corresponding to that of $HA_1$ set in the host address area (step 453). Subsequently, the contents of the receiving buffer 401 are transferred to the received data area 404 (step 456), as they are. On the other hand, when it is found at the step 451 that the address coinciding with $HA_1$ has been already stored in the host address area 402, the code $HCC_1$ is then compared with the value stored in the column of the host serial number area 403 which corresponds to the column of the host address area where the address $HA_1$ is located (step 454). When the comparison results in the absence of the value coinciding with $HCC_1$ at the corresponding column, this means that the message is the one that has not been received previously by the processing unit under consideration. Accordingly, the code $HCC_1$ is set at the column of the host serial number area corresponding to the column where the address $HA_1$ is present (step 455). The processing then proceeds to the following steps 456. On the other hand, when it is found at the step 454 that the value coinciding with $HCC_1$ is present at the corresponding column of the host serial number area, meaning that the message is the one received already, the processing comes to an end. Through the processing described above, reception of the message in duplicate from the NCP can be avoided.

Next, data flow in the transmission or communication system according to the illustrative embodiment will be described by referring to FIG. 5. It is now assumed that the processing unit 120 generates data including a function code FCa. It is further assumed that the data containing the function code FCa is to be utilized in the processing units 110, 230 and 310. At that time, the function code FCa is registered in the NCPs 10, 11, 12, 14, 20, 21, 23, 30, 31 and 33 through FC registration processing. For particulars of the FC registration processing for a multiple-loop transmission system, reference may be made to U.S. Pat. No. 4,510,492 already referred to above. The processing unit 120 sends the data FCa, HA, HCC and DATA to the NCP 12 which in turn sends out the corresponding message onto the transmission line 1. When the data returns to the NCP 12 after traveling around the transmission line, the message is fetched by the NCP 12 to be thereby erased (100). On the other hand, the NCP 14 fetches the same message because the function code FCa is registered in the NCP 14, wherein the fetched message is sent to the inter-networking unit 1430. The codes HA and HCC contained in the message are stored in the associated area of the inter-networking unit 1430. Thereafter, the message is sent to the NCP 30 connected to the transmission line 3. The NCP 30 behaves as the sender to send out the message on to the transmission line connected thereto and fetches the message after it has traveled around the transmission line to erase the message (103). The NCP 31 fetches the same message because the function code FCa is registered therein and sends it to the processing unit 310, where the codes HA and HCC of the message are stored in the associated areas provided in the processing unit 310. Thereafter, the processing unit 310 executes the processing in accordance with the contents of the DATA. In a similar manner, the message 100 on the transmission line 1 is transferred onto the transmission line 2 through the NCP 10, the inter-networking unit 1020 and the NCP 20 (refer to 102), and hence onto the loop 3 through the NCP 21, the inter-networking unit 2133 and the NCP 33 (refer to 1023). The NCP 31 connected to the transmission line 3 also fetches this message (1023) to send it to the processing unit 310 in which the codes HA and HCC of the message have, however, been already stored. Accordingly, this message is not processed by the processing unit 310. On the other hand, the NCP 30 fetches the message (1023) to send it to the inter-networking unit 1430 in which the codes HA and HCC of the message have, however, been stored in the associated areas of this unit. Accordingly, the message is erased without being sent to the NCP 14. Similarly, the inter-networking unit 2133 also erases the message 103 fetched by the NCP 33.

As will be appreciated from the foregoing description, in the multi-line transmission system including transmission lines of closed loop configuration, all the NCPs can mutually transfer only the desired data through the transmission lines without need for any specific NCP and without need for recognizing the transmission line or loop to which the destination or receiving NCP is connected.

It should be added that the present system is effectively adopted even in the case where each of the loops or transmission lines is additionally connected with a plurality of transmission lines or loops or where the closed loop configuration is not adopted.

Further, modifications of the above-described embodiments are possible within the spirit of the present invention as defined in the appended claims, in which a processing unit provided separately for each of the network control processors is implemented in the form of a single hardware including a network control unit and its associated processing units structurally unified.

In each of the inter-networking units as well as the inherent processing unit, the host address and the serial number may be each stored only in a number as required starting from the value updated most recently at any given time point. More particularly, each inter-networking unit erases the oldest address when the number of the stored addresses exceeds a requisite number.

The present invention has now provided a transmission system which can be implemented in varieties of configurations due to the multi-loop structure capable of including the closed loop transmission lines.

We claim:

1. A transmission control system comprising a plurality of transmission lines, a plurality of devices connected to said transmission lines for sending thereto and receiving therefrom messages and a plurality of interconnecting means for interconnecting said transmission lines so as to constitute at least one closed loop, wherein at least one of said interconnecting means includes:

means for storing therein message identifying information contained in a message which is received from a transmission line to which said interconnecting means is connected when said message is received for the first time; and means for judging, on the basis of message identifying information contained in a received message and said stored messages identifying information, whether or not said received message is to be relayed, and for inhibiting the relaying of said received message and inhibiting the storing of the message identifying information thereof in said storing means when it is judged that said received message is not to be relayed, said message identifying information being specific to a device from which said received message has been sent.

2. A transmission control system according to claim 1, wherein said interconnecting means includes means for storing said message identifying information each time said interconnecting means relays a message.

3. A transmission control system according to claim 1, wherein said judging and inhibiting means includes means for relaying a received message to all of the transmission lines with which said interconnecting means is associated, except to a transmission line from which said received message has been relayed.

4. A transmission control system according to claim 1, wherein said judging and inhibiting means comprises means for determining whether or not said received message identifying information coincides with said stored message identifying information.

5. A transmission control system according to claim 1, wherein said message identifying information includes a serial number for messages received by said interconnecting means.

6. A transmission control system according to claim 1, wherein said stored message identifying information includes identification codes constituted by addresses specific to devices with which said transmission lines are associated, said received message identifying information includes another identification code specific to a device from which a message is sent and each of said interconnecting means includes means for erasing the oldest address in said storing means when the number of the stored addresses exceeds a predetermined number of addresses, 7. A transmission control system according to claim 6, wherein each of said identification codes includes an address specific to a device and a serial number for communication.

8. A transmission control system comprising a plurality of transmission lines each connected to at least one of a plurality of devices for sending and receiving messages transmitted on a transmission line, and a respective interconnecting means disposed between respective pairs of transmission lines for interconnecting said pairs of transmission lines for relaying selected messages therebetween, wherein each message includes at least a first portion which uniquely identifies the message of which it is a part, each interconnecting means including means for storing said first portion of a message received from a transmission line, means for comparing said first portion of each received message as it is received with the content of said storing means to determine whether said message has been received previously by the interconnecting means from any transmission line and means for relaying a received message from one transmission line to another transmission line and storing the first portion thereof in said storing means only if said comparing means produces a negative comparing result.

9. A transmission control system according to claim 8, wherein said first portion of each message includes a sending device address and a message Serial number for the sending device.

10. A transmission control system according to claim 8, wherein at least one of said transmission lines is connected in the form of a loop.

11. A transmission control system comprising a plurality of transmission lines each connected to at least one of a plurality of devices for sending and receiving messages transmitted on a transmission line, and a respective interconnecting means disposed between respective pairs of transmission lines for interconnecting said pairs of transmission lines for relaying selected messages therebetween, wherein each message includes an information part which uniquely identifies the message of which it is a part, each interconnecting means including storage means for storing the information part of each a message received from a transmission line, means responsive to said information part of a message received from a transmission line and the content of said storage means for determining whether that message has been received previously by said interconnection means and means for relaying a received message from one transmission line to another transmission line and for storing the information part thereof in said storage means only if the message has not been received previously.

12. A transmission control system according to claim 11, wherein said information part of each message includes a message number for the sending device.

13. A transmission control system according to claim 11, wherein at least three of said transmission lines are interconnected by respective interconnecting means to form a loop path for messages relayed between transmission lines.

14. A transmission control system according to claim 13, wherein at least one of said transmission lines is formed as a loop transmission line.

* * * * *